J. S. KEHR.
ANIMAL MUZZLE.
APPLICATION FILED MAY 16, 1918.

1,300,977.

Patented Apr. 15, 1919.

WITNESSES
R. W. Hoagland
A. P. Collingsworth

INVENTOR
Jesse S. Kehr
BY Richard B. Owen.
ATTORNEY

UNITED STATES PATENT OFFICE.

JESSE S. KEHR, OF WAKARUSA, INDIANA.

ANIMAL-MUZZLE.

1,300,977.

Specification of Letters Patent. Patented Apr. 15, 1919.

Application filed May 16, 1918. Serial No. 234,951.

*To all whom it may concern:*

Be it known that I, JESSE S. KEHR, a citizen of the United States, residing at Wakarusa, in the county of Elkhart and State of Indiana, have invented certain new and useful Improvements in Animal-Muzzles, of which the following is a specification.

This invention relates to an improvement in animal muzzles and particularly to a muzzle designed to be worn by horses to prevent them from biting trees and eating corn and other vegetation while cultivating the same.

The object of the invention is to provide a muzzle which shall be strong, simple, easy of application and which may be placed over the animal's mouth and removed therefrom without becoming entangled in the bridle or bit.

Figure 1:
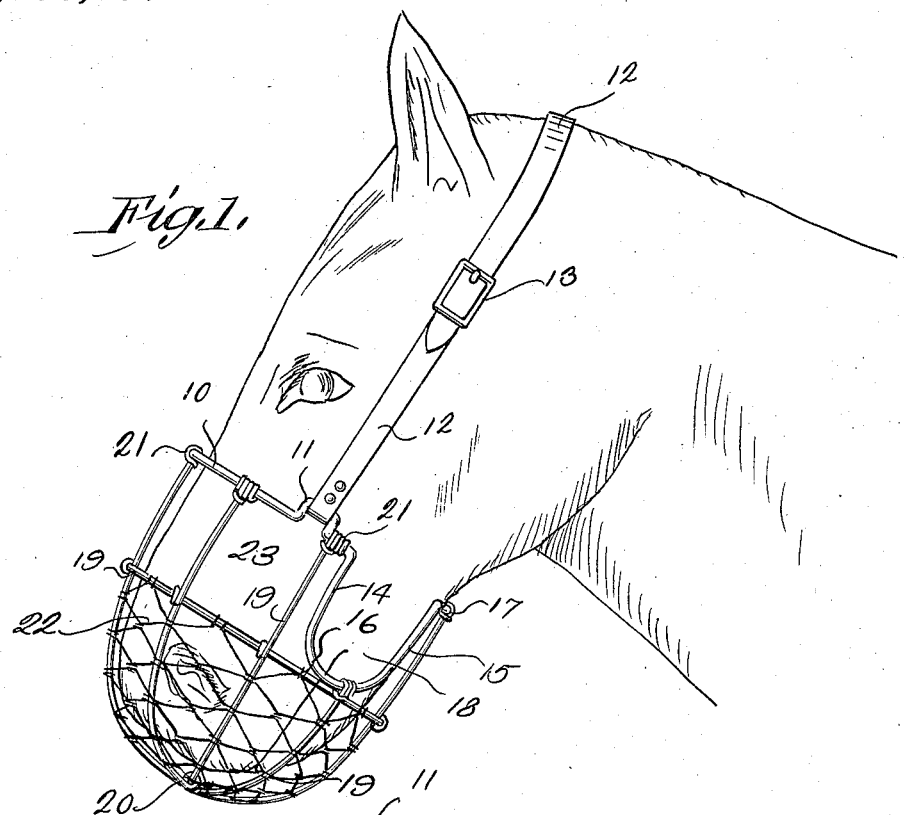
Figure 2:
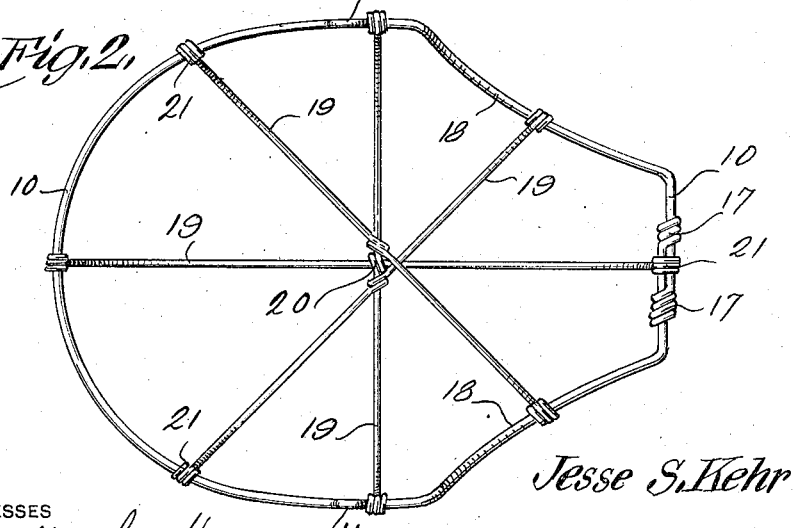

With these objects in view, together with others which will appear as the description proceeds, the invention consists in the novel formation, combination, and arrangement of parts all as will be described more fully hereinafter, particularly pointed out in the claim and illustrated in the accompanying drawings, in which:

Figure 1 is a side elevation of the improved muzzle in position on the head of a horse, and Fig. 2 is a top plan view of the muzzle.

In the drawings, the muzzle is shown as made in the form of a basket with an open top, around the edge of which top is a band 10 preferably made of stiff heavy wire in order to maintain the muzzle in proper shape, said band being of semi-circular form at the front and of a radius sufficiently great to pass easily around the nose of the animal wearing the muzzle at a point some distance above the corners of the animal's mouth as shown in Fig. 1. At opposite sides of the band 10 it is bent upwardly as shown to form two offsets 11 to which are secured straps 12 designed to pass around the animal's head behind the ears and joined by a buckle 13 for holding the muzzle in place on the animal's head, or these straps may be arranged for attachment to the bridle. A short distance in rear of the offsets, the bands 10 are bent downwardly as at 14 and then upwardly at 15, forming a looped portion 16 on each side of the muzzle that passes below the corners of the animal's mouth and under the bit when the muzzle is in place. From the upper ends of the portions 15 the ends of the wire are passed below the under jaw of the animal and connected by wrapping each end about the other, as at 17. The depressed portions 18 at the side of the muzzle enable the latter to be positioned over the mouth of the animal and readily removed therefrom without dislodging the bit and without necessitating the loosening of any buckles or other fastenings, and furthermore permits the muzzle to extend sufficiently high on the animal's head as to be perfectly safe and free from danger of removal by the animal himself.

Connected to the band 10 are a number of wire loops 19 of smaller gage than the band 10 which loops curve downwardly from the band and crossing each other below the mouth of the animal are connected by wrapping these loops one about the other. The ends of each loop 19 are connected to opposite sides of the band 10 by wrapping them tightly around said band as at 21. This wrapping may be further secured by soldering or welding if so desired. These several loops extend downwardly and then pass under the mouth of the animal to form the bottom of the muzzle, which is further protected by covering the lower end of the muzzle below the depressed portions 18 with wire netting 22, the upper edge of which is attached to an encircling band of wire 23 secured to the loops 19, somewhat below the main band 10 and in contact with the lower portions of the depressions 18, and the netting 22 by preference rising as high as the second band 23 and may be soldered or welded or otherwise fastened to the loops 19 at various points in order to secure its retention in proper position.

As thus described this muzzle forms ample protection for corn and other plants, trees and shrubs through which the animal may be driven, by preventing him from eating these plants, biting and gnawing trees and shrubs, at the same time allowing sufficient room for the animal to move his jaws with full freedom and also to drink without inconvenience.

If preferred, a number of wire bands similar to the band 23 and parallel thereto may extend from said band to the lower end of the muzzle, these bands being used instead of the netting 22.

The foregoing description and the drawings have reference to what may be considered the preferred, or approved form of my invention. It is to be understood that I may make such changes in construction and arrangement of parts, materials, dimensions, et cetera, as may prove expedient and fall within the scope of the appended claim.

Having thus fully described my invention, what I claim as new and desire to secure by Letters Patent, is:

The herein described muzzle comprising a main band having offsets at opposite sides thereof and dropped portions in rear of the offsets, a second band paralleling the body of the first and contacting with its dropped portions, a series of loops connected at their extremities with the main band at opposite points, extending thence downward and wrapped around the second band, and crossing each other at the bottom of the muzzle, one of these loops connecting the dropped portions, wire netting carried by the lower band and the lower portions of said loops, and straps rising from the offsets of the main band and adapted to be connected by a buckle.

In testimony whereof I affix my signature in presence of two witnesses.

JESSE S. KEHR.

Witnesses:
 SAMUEL SINGER,
 FANNIE SINGER.

Copies of this patent may be obtained for five cents each, by addressing the "Commissioner of Patents, Washington, D. C."